United States Patent [19]
Matsukura et al.

[11] Patent Number: 6,127,479
[45] Date of Patent: *Oct. 3, 2000

[54] WATER-DISPERSIBLE ACRYLIC BASED GRAFT COPOLYMERS, A METHOD FOR MAKING THEM AND WATER-BASED PAINTS THEREOF

[75] Inventors: Yoshiaki Matsukura, Yokohama; Atsuhiro Sakai, Ebina, both of Japan; Hitoshi Taniguchi, West Bloomfield, Mich.; Yoshiaki Kawamura, Kamakura, Japan

[73] Assignee: BASF Coatings AG, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/803,580

[22] Filed: Feb. 20, 1997

Related U.S. Application Data

[63] Continuation of application No. 08/776,723, filed as application No. PCT/EP95/03145, Aug. 8, 1995, abandoned.

[30] Foreign Application Priority Data

Aug. 11, 1994 [JP] Japan ..................................... 6-189396

[51] Int. Cl.$^7$ ........................ C08F 265/00; C08F 265/02; C08F 265/04; C08F 265/06
[52] U.S. Cl. .............................. 525/67; 525/69; 525/309
[58] Field of Search ................................. 525/309, 67, 69

[56] References Cited

FOREIGN PATENT DOCUMENTS 56-49760  5/1981  Japan .
2060654  5/1981  United Kingdom .

*Primary Examiner*—Jeffrey C. Mullis

[57] ABSTRACT

Provided are paint films with outstanding paint film performance traits such as water resistance and chemical resistance, etc., and outstanding finished appearance. The water-based paints are easy to apply and have outstanding storage stability. The invention further provides an acrylic graft copolymer obtained by reacting a acrylic copolymer (a) of acid number 35 to 120 mg KOH/g, hydroxyl group number 50 to 150 mg KOH/g, glass transition temperature −20 to +50° C. and number average molecular weight 4500 to 9000, and a monomer combination (b) comprising an unsaturated monomer (b1) containing a glycidyl group and an unsaturated monomer (b2) containing a hydroxyl group to give an acid number of ≦15 mg KOH/g and a hydroxyl group number of 50 to 150 mg KOH/g. Copolymer (a) and monomers (b) are reacted in specified proportions in a single stage to make the claimed water-dispersible acrylic graft copolymer which has an acid number of 10 to 30 mg KOH/g, a hydroxyl group number of 50 to 150 mg KOH/g, a glass transition temperature of −20 to +50° C. and a number-average molecular weight of 10,000–100,000 by grafting side chains formed from the aforementioned (b) to a main chain from the aforementioned (a), and this graft copolymer is dispersed in an aqueous medium to obtain the claimed water-based paint.

13 Claims, No Drawings

WATER-DISPERSIBLE ACRYLIC BASED GRAFT COPOLYMERS, A METHOD FOR MAKING THEM AND WATER-BASED PAINTS THEREOF

This case is a continuation of Ser. No. 08/776,723, filed Feb. 11, 1997, now abandoned, which is a 371 of PCT/EP95/03145 filed Aug. 8, 1995 which is hereby incorporated by reference in its entirety,

BACKGROUND OF THE INVENTION

The present invention relates to novel water-dispersible graft copolymers which have a main chain which forms a stabilizing layer and side chains which constitute a dispersed layer and are useful as paint-film-forming components, to a method for making them, and to water-based paint which includes an afore-mentioned water-dispersible acrylic graft copolymer.

Water-based paints have come to be widely adopted instead of solvent-based paints on account of their superiority from the point of view of environmental protection and worker safety. For example, in the field of metallic paint painted onto the outside panels of cars, etc., solvent-based paints using large quantities of organic solvents are being progressively replaced by water-based paints in which water is used as the solvent.

The hydrophillic resins generally employed in water-based paints or water-based paint compositions are random copolymers having a quantity of carboxyl groups necessary to render them hydrophillic; and dispersions formed by neutralizing such a polymer with a basic substance and dispersing it in an aqueous medium are used in water-based paint.

However, although water-based paints from such aqueous dispersions, such as water-based paint from an aqueous dispersion of an acrylic type random copolymer for example, are suitable for improving appearance because pigment dispersion and the Theological properties of the paint liquid are good and they form paint films of outstanding gloss and smoothness, the durability of the paint film is low because of the high acid number of the acrylic type polymers. When the viscosity of water-based paints obtained from these is adjusted to make it suitable for painting, the solids concentration thereof decreases dramatically, and painting faults such as drip and uneven application, etc., are prone to be produced.

In order to improve such points, water-based paint compositions have been offered which include an acrylic graft copolymer from a hydrophillic component and a hydrophobic component. For example, in Japanese Unexamined Patent 56-49760 water-based paint compositions are described which contain as the resin component an acrylic graft copolymer obtained by copolymerizing an acrylic polymer of acid number 40–200 containing unsaturated groups, obtained by reacting an unsaturated monomer containing a glycidyl group with a carboxy-functional acrylic polymer, and a monomer combination combining an α,β-ethylenic unsaturated carboxylic acid and another copolymerizable unsaturated monomer to give an acid number of ≦30, such that the difference in acid number in the reaction product composition is 25–200, and by this means making a graft copolymer which has an acid number of 15–40 and a glass transition temperature of −10° C. to 70° C.

However, in making an acrylic graft copolymer such as described above it is necessary first to react a carboxy-functional acrylic polymer with an unsaturated monomer containing a glycidyl group, and then to graft copolymerize a monomer combination; therefore the manufacturing process is complicated by a 2-stage reaction process. Moreover, in the preliminary reaction of an acrylic polymer with an unsaturated monomer containing a glycidyl group, it is necessarily to employ a polymerization stopper so that the grafted chains are not extended by free radical polymerization of the unsaturated monomer, and in the subsequent reaction it is necessary to add a large quantity of polymerization initiator so that free radical polymerization will proceed to form a grafted chain even though the polymerization stopper may be present; and polymerization side reactions become prone to occur. When an acrylic graft copolymer made by the method described above is used as the main resin in a water-based paint the paint film formed may yellow due to contamination of the paint with the polymerization stopper. Improvement in ease of painting would also be desirable.

SUMMARY OF THE INVENTION

A purpose of the present invention is to offer novel and useful water-dispersible acrylic graft copolymers which can be employed as the paint-film-forming resin (main resin) of water-based paint, which when so used enable the formation of paint films which have excellent paint performance traits such as resistance to water (water resistance and resistance to chemicals (chemical resistance), etc., and excellent finished appearance, and have outstanding ease of application and storage stability.

A second purpose of the present invention is to propose a method whereby the acrylic graft copolymers can be made efficiently and simply by a single-stage reaction starting from an acrylic copolymer.

A third purpose of the present invention is to offer water-based paints containing an acrylic graft polymer described above, which can form paint films which have excellent paint performance traits such as water-resistance and chemical resistance, etc., and excellent finished appearance, and have outstanding ease of application and storage stability.

The present invention is the following acrylic graft copolymers, a method for making them and water-based paint.

(1) Water-dispersible acrylic graft copolymers characterized in that they are graft copolymers made by reacting an acrylic copolymer (a) of acid number 35 to 120 mg KOH/g, hydroxyl group number 50 to 150 mg KOH/g, glass transition temperature −20 to +50° C. and number average molecular weight 4500 to 9000 comprising a copolymer of α,β-ethylenic unsaturated monomers, and a monomer combination (b) combining an α,β-ethylenic unsaturated monomer (b1) containing a glycidyl group and an α,β-ethylenic unsaturated monomer (b2) containing a hydroxyl group to give an acid number of ≦15 mg KOH/g and a hydroxyl group number of 50 to 150 mg KOH/g (b), in the proportions (a)/(b) (weight ratio)=10/90 to 60/40 with (b1)/(a) (mol ratio) 0.4–1.5, and have an acid number of 10 to 30 mg KOH/g, a hydroxyl group number of 50 to 150 mg KOH/g, a glass transition temperature of −20 to +50° C. and a number average molecular mass of 10,000 to 100,000.

(2) A method for making a water-dispersible acrylic graft polymer, characterized in that an acrylic copolymer (a) of acid number 35 to 120 mg KOH/g, hydroxyl group number 50 to 150 mg KOH/g, glass transition temperature −20 to +50° C. and number average molecular weight 4500 to 9000 comprising a copolymer of α,β-ethylenic unsaturated monomers, and a monomer combination combining an α,β-ethylenic unsaturated monomer (b1) containing a glycidyl group and an α,β-ethylenic unsaturated monomer (b2) containing a hydroxyl group to give an acid number of ≦15 mg KOH/g and a hydroxyl group number of 50 to 150 mg KOH/g (b), are reacted in the proportions (a)/(b) (weight ratio)=10/90 to 60/40 with (b1)/(a) (mol ratio) 0.4–1.5, to make a water-dispersible graft copolymer having an acid number of 10 to 30 mg KOH/g, a hydroxyl group number of 50 to 150 mg KOH/g, a glass transition temperature of −20 to +50° C. and a number average molecular mass of 10,000 to 100,000.

(3) Water-based paint characterized in that it contains an acrylic graft copolymer according to (1) above.

DETAILED DESCRIPTION OF THE PREFERRED EMBODIMENTS

Water-dispersible acrylic graft copolymers of the present invention (also called simply acrylic graft copolymers hereafter) are graft polymers in which the main chain is a hydrophillic acrylic copolymer (a) which hydrates when dispersed in water and forms a stabilizing layer, and a monomer combination (b) is polymerized to this main chain to give hydrophobic side chains which form a dispersed layer when dispersed, grafted on via ether linkages.

In the present invention the expressions "(meth)acrylic acid" and "(meth)acrylate" respectively signify "acrylic acid and/or methacrylic acid" and "acrylate and/or methacrylate".

The essential components of the acrylic copolymer (a) which forms a stabilizing layer are an α,β-ethylenic unsaturated monomer containing a carboxyl group and an α,β-ethylenic monomer containing a hydroxyl group; and it can be made from these α,β-ethylenic unsaturated monomers, with the addition if necessary of other copolymerizable unsaturated monomers, by a known method of solution polymerization in the presence of a suitable polymerization catalyst.

Examples of α,β-ethylenic unsaturated monomers containing a carboxyl group include acrylic acid, methacrylic acid, crotonic acid, itaconic acid and maleic acid, etc. These can be employed singly or in combinations of 2 or more.

Examples of α,β-ethylenic unsaturated monomers containing a hydroxyl group include hydroxyalkyl esters of (meth)acrylic acid such as 2-hydroxyethyl (meth)acrylate, 2-hydroxypropyl (meth)acrylate and 3-hydroxy-propyl (meth)acrylate, etc., polyether polyols such as polyethylene glycol and polypropylene glycol, etc., monoethers with α,β-ethylenic unsaturated monomers containing a hydroxyl group such as 2-hydroxyethyl (meth)acrylate, etc., and lactone-modified α,β-ethylenic unsaturated monomers in which 1 to 10 mol of a lactone such as ε-caprolactone or γ-butyrolactone, etc., has been added to a hydroxyalkyl ester of (meth)acrylic acid, etc. These can be used singly or in combinations of 2 or more.

Other copolymerizable unsaturated monomers which can be used if necessary include esters—for example $C_1$–$C_{18}$ alkyl esters of (meth)acrylic acid such as methyl (meth) acrylate, ethyl (meth)acrylate, propyl (meth)acrylate, isopropyl (meth)acrylate, butyl (meth)acrylate, hexyl (meth) acrylate, octyl (meth)acrylate and lauryl (meth)acrylate, etc., and alkoxyalkyl esters of (meth)acrylic acid such as methoxybutyl (meth)acrylate, methoxyethyl (meth)acrylate and ethoxybutyl (meth)acrylate, etc.; amides of acrylic acid or methacrylic acid—amides of (meth)acrylic acid such as N-methylol(meth)acrylamide and N-isobutoxymethylol (meth)acrylamide, etc.; and aromatic vinyl compounds such as styrene, α-methylstyrene and vinyltoluene, etc.

An acrylic copolymer (a) can be obtained by performing solution polymerization according to an ordinary method using these monomers in the presence of a known polymerization initiator such as azobis(isobutyronitrile), benzyl peroxide, t-butyl peroxybenzoate, t-butyl peroxide or t-butylperoxy-2-ethylhexanoate, etc. This reaction is performed in such a way that the acrylic co-polymer (a) that is produced has an acid number of 35 to 120 mg KOH/g, and preferably 50 to 110 KOH/g, a hydroxyl group number of 50 to 150 mg KOH/g, and preferably 60 to 150 mg KOH/g, a glass transition temperature of −20 to +50° C., and preferably −20 to +30° C., and a number average molecular mass of 4500 to 9000, and preferably 4800 to 7000.

When the acid number of the acrylic copolymer (a) is less than 35 mg KOH/g its action as a stabilizing layer is inadequate, and therefore the acrylic graft copolymer is prone to agglutinate in aqueous media and storage properties are inferior; and when it exceeds 120 mg KOH/g it becomes highly hydrophillic, so that the water-resistance of paint films formed from water-based paint containing the resulting acrylic graft copolymer are inferior.

When the hydroxyl group number of the acrylic copolymer (a) is less than 50 mg KOH/g the chemical resistance of the resulting paint films is inferior because resulting acrylic acid graft copolymers do not have enough crosslinking points with amino resins used as hardening agents; and when it exceeds 150 mg KOH/g hydrophillic properties are conferred on the resulting acrylic graft copolymers, and therefore the water resistance of paint films formed from waterbased paint including them is inferior.

When the glass transition temperature of the acrylic copolymer (a) is less than −20° C. the resulting acrylic graft copolymers that are obtained are prone to agglutinate in aqueous media and the storage stability of the aqueous dispersion is inferior, and when the glass transition temperature exceeds +50° C. the softening temperature of the resulting acrylic graft copolymers becomes high and therefore the smoothness of films of water-based paints containing them is inferior.

When the number average molecular weight of the acrylic copolymer (a) is less than 4500 it cannot form an adequate stabilizing layer, and the storage stability of aqueous dispersions of the resulting acrylic graft copolymers is inferior; and when it exceeds 9000 the viscosity of aqueous dispersions of the resulting acrylic graft copolymers becomes high, the paint solids content of water-based paints prepared from them is lowered and they are inferior when it comes to dripping.

The essential components of the monomer combination (b) reacted with an acrylic copolymer (a) described above are an α,β-ethylenic unsaturated monomer (b1) containing a glycidyl group and an α,β-ethylenic unsaturated monomer (b2) containing a hydroxyl group, combined if necessary with other copolymerizable monomers (b3) which can copolymerize with these, to give an acid number of ≦15 mg KOH/g, and preferably ≦10 mg KOH/g, a hydroxyl group 50 to 150 mg KOH/g, and preferably 50 to 120 mg KOH/g.

Examples of α,β-ethylenic unsaturated monomers (b1) containing a glycidyl group include glycidyl (meth)acrylate and allyl glycidyl ether, etc. α,β-ethylenic unsaturated monomers (b2) containing a hydroxyl group and other copolymerizable molecules (b3) include those given as examples in the discussion of the aforementioned acrylic copolymer (a).

When the acid number of the monomer combination (b) exceeds 15 mg KOH/g the resulting acrylic graft copolymers become water-soluble, their viscosity becomes high, and the ease of application of water-based containing them becomes poor. Water-resistance is also inferior.

When the hydroxyl group number of the monomer combination (b) is less than 50 mg KOH/g the number of crosslinking points between the resulting acrylic graft copolymers and the amino resins that are used as hardening agents is inadequate, and therefore the chemical resistance of the resulting paint films is inferior, and when it exceeds 150 mg KOH/g the polymer becomes highly hydrophillic, and the water-resistance of the resulting paint films is inferior.

Acrylic graft copolymers of the present invention are obtained by reacting an aforementioned acrylic copolymer (a) with the monomer combination (b). This reaction is performed under the conditions that the ratio of the acrylic copolymer (a) and the monomer combination (b) given as (a)/(b) (weight ratio) is 10/90 to 60/40, and preferably 20/80 to 40/60, and (b1)/(a) (mol ratio) is 0.4 to 1.5, and preferably 0.8 to 1.2.

The number of mols of the acrylic copolymer (a) can be decided by calculation from the polystyrene-equivalent number average molecular weight determined by ordinary gel permeation chromatography.

When (a)/(b) (weight ratio) is less than 10/90 an adequate stabilizing layer cannot be formed, and the storage stability of aqueous dispersions of the resulting acrylic graft copolymers is inferior, and when it exceeds 60/40 the viscosity of aqueous dispersions of the graft copolymers obtained becomes exceedingly high, the painted solids content of water-based paints containing such an acrylic graft copolymer is lowered and drip properties are inferior.

Further, when the quantity of α,β-ethylenic unsaturated monomer (b1) containing a glycidyl group included relative to the acrylic copolymer (a) as a mol ratio is less than 0.4, grafting with component (b) becomes inadequate and the resulting acrylic graft polymers will not disperse readily in aqueous dispersion, or the storage stability of the aqueous dispersion obtained will be poor; and when it exceeds 1.5 gelling is produced and it is impossible to make an acrylic graft copolymer.

The reaction of an acrylic copolymer (a) with a monomer combination (b) can be performed by solution polymerization of a separately made acrylic copolymer (a) with a monomer combination (b) in an organic solvent by a known method, or performed by solution polymerization in an organic solvent by a known method after having made the acrylic copolymer (a), by adding the monomer combination (b) to the reaction liquor from which the acrylic copolymer (a) is made. The latter is preferred because in this case the manufacture of the acrylic copolymer (a) can be made continuous with the manufacture of the acrylic graft copolymer.

As the organic solvent above, toluene, methyl isobutyl ketone, methyl ethyl ketone, ethylene glycol monoethyl ether (ethyl Cellosolve), ethylene glycol monobutyl ether (butyl Cellosolve), propylene glycol monopropyl ether or propylene glycol monoethyl ether, etc., or a mixture thereof can be used. When performed after having made the acrylic copolymer (a), the organic solvent used in making the acrylic polymer (a) can be employed as it stands, or new solvent can be added.

As the polymerization initiator the same polymerization initiators given as examples in the case of making the acrylic copolymer (a) can be used. When performed after having made the acrylic copolymer (a) only the quantity lacking needs to be added.

It is desirable that the total concentration of the acrylic copolymer (a) and the monomer combination (b) in the reaction liquid is 30 to 90 wt %, and preferably 50 to 80 wt %, and that the concentration of polymerization initiator relative to the total quantity of monomers is 0.1 to 10 wt %, and preferably 0.5 to 5 wt %. It is also desirable that the reaction temperature is 20–180° C., and preferably 40–160° C., and that the reaction time is 1–10 hours.

The acid number, hydroxyl group number, glass transition temperature and number average molecular weight of the acrylic graft copolymer that is obtained can be adjusted by selection of the type and quantity of acrylic copolymer (a) and monomer combination (b), and the reaction conditions such as reaction temperature, reaction time and the type and quantity of the polymerization initiator employed.

In the reaction above, free radical polymerization of the monomers (b1) to (b3) proceeds simultaneously with ring-scission addition of the carboxy groups of the acrylic copolymer (a) and the glycidyl groups of the (b1) component containing a glycidyl group, to achieve graft polymerization and make an acrylic graft copolymer in a single reaction stage.

In a method such as in the aforementioned Japanese Unexamined Patent 56-49760 in which an acrylic copolymer is first reacted with a monomer containing a glycidyl group it is necessary to use a polymerization stopper in order to stop the radical polymerization of the monomer containing a glycidyl group, but in the present invention a polymerization stopper is not necessary because the addition reaction and free radical reaction occur simultaneously; therefore the yellowing of paint films caused by the polymerization stopper is prevented.

Acrylic graft copolymers of the present invention are graft copolymers made as described above, and are water-dispersible acrylic graft copolymers having an acid number of 10 to 30 mg KOH/g, and preferably 15 to 30 mg KOH/g, a hydroxyl group number of 50 to 150 mg KOH/g, and preferably 50 to 120 mg KOH/g, a glass transition temperature of −20 to +50° C., and preferably −10 to +30° C., and a number average molecular weight of 10,000–100,000, and preferably 10,000–50,000.

When the acid number of the acrylic graft copolymer is less than 10 mg KOH/g it becomes difficult to disperse in aqueous media and storage stability is inferior; and when it exceeds 30 mg KOH/g the viscosity of the resulting aqueous dispersions becomes exceedingly high, and this lowers the painted solids content of paint containing it and gives inferior drip properties.

When the hydroxyl group number of the acrylic graft copolymer is less than 50 mg KOH/g the number of crosslinking points between the acrylic graft copolymer and amino resins used as curing agents is inadequate, and therefore the water-resistance of the resulting paint films is inferior; and when it exceeds 150 mg KOH/g the water resistance of the resulting paint film is inferior because the acrylic graft copolymer becomes very hydrophillic.

When the glass transition temperature of the acrylic graft copolymer is less than −20° C. the acrylic graft copolymers become prone to agglutinate in aqueous media, and the storage stability of the aqueous dispersions obtained is inferior; and when it exceeds +50° C. the smoothness of the paint films formed from water-based paints containing the acrylic graft copolymers is inferior.

When the number average molecular weight of the acrylic graft copolymer is less than 10,000 the chemical resistance and water resistance of paint films formed from water-based paints containing these acrylic graft copolymers are inferior; and when it is over 100,000 there is a possibility of gel formation when making water-based paint; and neither case is desireable.

After making an acrylic graft copolymer of the present invention as described above, it can be made into an aqueous dispersion by removing the solvent, neutralizing it with a basic substance, and dispersing in an aqueous medium. Dispersion in an aqueous dispersion medium can be performed by an ordinary method: for example, it can be performed by neutralizing at least 40% of the carboxyl groups present in the acrylic graft copolymer by using an amine such as dimethylethanolamine, etc. The aqueous dispersion medium is preferably one in which water accounts for 40–80 wt %.

Aqueous dispersions so obtained can be employed as they stand as water-based paint, but they can also be made into water-based paint by concentration or dilution, or by being powdered and then resuspended. An acrylic graft copolymer can be used on its own as the paint-film-forming component of the water-based paint; but further combination with a hardening agent to prepare a water-based paint (water-based paint composition) in which it is the main resin component is preferred because the performance of the paint film is further improved.

As the hardening agent it is desirable that an amino resin, and particularly an amino resin of a number average molecular weight of $\leq 1000$, is employed. Examples of such amino resins available as commercial products include Cymel 301, Cymel 303, Cymel 325 and Cymel 327 (trade names Mitsui Scitech), Nikalac MW-30 and Nikalac MX43 (trade names Sanwa Chemicals) and Yuban 120 (Mitsui Toatsu Chemicals). The number average molecular weight of the amino resin is the polystyrene-equivalent number average molecular weight determined in the ordinary way by gel permeation chromatography.

If necessary, hydrophillic organic solvents can be added to water-based paint of the present invention. Examples of such hydrophillic organic solvents include ethylene glycol monoethyl ether, ethylene glycol monobutyl ether, diethylene glycol monobutyl ether, ethylene glycol monohexyl ether, propylene glycol monomethyl ether, propylene glycol monoethyl ether and propylene glycol monobutyl ether, etc.

If necessary metallic pigments, inorganic pigments and/or organic pigments, etc., can also be added. There is no specific restriction as to the method used for adding pigments, and this can be performed by a prior known method. Moreover, if necessary additives such as acid catalysts and surface preparation agents, etc., conventionally added to water-based paints can also be included.

Water-based paints of the present invention have outstanding storage stability and are also outstandingly easy to apply; and the paint films obtained from them have excellent paint film performance traits such as water-resistance, chemical resistance, durability and smoothness, etc.

Water-based paints of the present invention can be employed as a base coat; in this case, the same methods can be implemented as with ordinary water-based base coating, and they are particularly suitable for the prior known 2 coats 1 bake method in which the base coat and top coat are applied wet on wet and the two are baked simultaneously.

They can be applied by any method of painting such as roller coating, brush, or spray application, etc. They can be baked at 60 to 180° C. for 10 to 60 minutes, and preferably at 110 to 150° C. for 15 to 30 minutes.

Benefits such as those described can be obtained from the present invention when the ranges of values hitherto explained, for example the properties of the acrylic copolymer (a) and the monomer combination (b), the proportions of these in the reaction, the reaction conditions, and the physical properties of the acrylic graft copolymer, etc., are within the recorded ranges of values; and particularly outstanding benefits are obtained when the ranges of the various values are within the ranges of values described as preferred ranges of values.

Water-dispersible acrylic graft copolymers of the present invention are novel and are useful as paint-forming resins for water-based paints. Since acrylic graft copolymers of the present invention are constituted from a main chain which forms a stabilizing layer, and side chains which form a dispersed layer, they are outstandingly water-dispersible, and consequently when such an acrylic graft copolymer is used as a paint-film-forming resin in a water-based paint the resulting water-based point does not agglutinate and has excellent storage properties. Since acrylic graft copolymers of the present invention are also made by reacting in specified proportions specified acrylic copolymers (a) and monomer copolymers (b) having specified properties, and also have specified properties, when such acrylic graft copolymers are used as paint-film-forming resins in water-based paints the ease of application of the resulting water-based paints is excellent, and paint films formed from them have outstanding paint film performance traits such as water resistance and chemical resistance, etc., and also an excellent finished appearance.

Since the method for making water-dispersible acrylic graft copolymers of the present invention involves reacting in specified proportions of specified acrylic copolymers (a) and monomer combinations (b) having specified properties, it enables an acrylic graft copolymer mentioned above to be made simply and efficiently from acrylic copolymers (a) by a single-stage reaction.

Since water-based paints of the present invention contain an acrylic graft copolymer mentioned above as a paint-film-forming resin they have outstanding ease of application and storage stability, and moreover paint films formed from them have outstanding paint film performance traits such as water resistance and chemical resistance, etc., and also an excellent finished appearance.

EXAMPLES

The present invention will next be explained in more detail by means of practical embodiments; however, the present invention is not limited in any way by these examples. In the examples "parts" signifies "parts by weight" unless it is indicated otherwise. The method of painting and the methods for evaluating paint film appearance, paint film performance traits and storage stability are as follows.

As the test sheets for painting the following was used. Thus, zinc-phosphate-treated sheet steel electro-coated with cationic electrocoat paint (Aqua No. 4200; trade name Nippon Yushi) to give a dry film thickness of 20 μm and baked at 185° C. for 20 minutes, and then air sprayed with a mid-coat paint ("Haiepiko" No. 100CP sealer; trade name Nippon Yushi) to give a dry film thickness of 40 μm and baked at 140° C. for 20 minutes, was used.

Water-based paint compositions prepared in the different embodiments were applied to these test sheets by the known 2 coats 1 bake method. Thus, the water-based paint was spray coated on in a painting environment of temperature 25° C. and relative humidity 75% to give a dry film thickness of 15 μm, and then dried by heating at a temperature of 80° C. for 10 minutes, after which it was cooled to room temperature and then a commercial clear topcoat paint (Belcoat No. 6000; trade name Nippon Yushi) was spray coated on to give a dry film thickness of 40 μm, followed by setting for 10 minutes and then baking at 140° C. for 30 minutes. The object being painted was held vertical in the same position throughout.

Paint film appearance
1) 60° gloss
By the JIS K5400 (1990) 7.6 mirror surface gloss.
2) Smoothness
The paint film was evaluated with the naked eye as follows:
○: favourable
x: inferior
3) Drip
Assessed from the length of drip under a 10-mm diameter hole opened in the painted sheet, when painted to give a dry film thickness of 30 μm, according to the following criteria.
○: <2 mm
x: ≧2 mm
Paint film performance traits
1) Water resistance
Assessed by observation of the state of the painted surface with the naked eye after immersion for 4 hours in hot water of ≧90° C., according to the following criteria.
○: no abnormality
x: blistering 2) Chemical resistance
Assessed by observation of the state of the painted surface with the naked eye after immersion for 1 hour in regular gasoline at 40° C., according to the following criteria.
○: no abnormality
x: shrinkage
Storage stability
The change (%) in the viscosity of the water-based composition after storage at 40° C. for 20 days relative to the initial viscosity (ps/6 rpm (B viscosimeter)) was assessed according to following criteria.
○: <±15%
x: ≧±15%

Embodiments 1–8

1) Making an acrylic graft copolymer

Methyl isobutyl ketone 56.4 parts was put into a reaction vessel provided with a stirrer, a temperature regulator, a cooling tube and a dropping device, stirred as the temperature was raised, and refluxed. Next, a mixture of 2-hydroxyethyl methacrylate 41.8 parts, acrylic acid 11.6 parts, n-butyl acrylate 93.6 parts, 2-ethylhexyl methacrylate 33.0 parts and azobis(isobutyronitrile) 3.6 parts was added dropwise, requiring 2 hours. Stirring under reflux was continued for a further 2 hours to complete polymerization (hereafter this reaction process is referred to as "Process 1").

The resin obtained was an acrylic copolymer having an acid number of 50 mg KOH/g, a hydroxyl group number of 100 mg KOH/g, a glass transition temperature of −20° C. and a number average molecular weight of 5000.

Next, methyl isobutyl ketone 328.6 g was put into this resin solution, and it was refluxed under stirring. Then a mixture of glycidyl methacrylate 5.1 parts, 2-hydroxyethyl methacrylate 97.5 parts, methyl methacrylate 200.2 parts, n-butyl acrylate 122.3 parts and azobis(isobutyronitrile) 6.3 parts were added dropwise, requiring 2 hours. The addition and polymerization reaction was completed by continuing stirring for a further 5 hours (hereafter this reaction process is called "Process 2").

The resulting acrylic graft copolymer A-1 was a resin solution having an acid number of 12 mg KOH/g, a hydroxyl group number of 100 mg KOH/g, a glass transition temperature of +13° C. and a number average molecular weight of 42,000.

Acrylic graft copolymers A-2 to A-8 were also made by the same method according to the formulations of Table 1 and Table 2. Their properties are shown in Table 1 and Table 2.

TABLE 1

| Acrylic graft copolymer No. | A-1 | A-2 | A-3 | A-4 |
|---|---|---|---|---|
| Process 1 (parts by weight) | | | | |
| Solvent composition | | | | |
| Methyl isobutyl ketone | 56.4 | 155.2 | — | 76.4 |
| Toluene | — | — | 77.0 | — |
| Monomer composition | | | | |
| 2-Hydroxyethyl methacrylate | 41.8 | 55.7 | 27.9 | 41.8 |
| Acrylic acid | 11.6 | 15.4 | 15.4 | 15.4 |
| n-Butyl acrylate | 93.6 | 124.9 | 28.7 | 3.2 |
| 2-Ethylhexyl methacrylate | 33.0 | 44.0 | 48.0 | 47.6 |
| Styrene | — | — | — | 12.0 |

TABLE 1-continued

| Acrylic graft copolymer No. | A-1 | A-2 | A-3 | A-4 |
|---|---|---|---|---|
| Initiator | | | | |
| Azobis(isobutyronitrile) | 3.6 | 4.8 | — | — |
| t-Butylperoxy-2-ethyl-hexanoate | — | — | 3.0 | — |
| t-Butyl peroxybenzoate | — | — | — | 3.6 |
| Reaction temperature | reflux | reflux | reflux | reflux |
| Process 2 (parts by weight) | | | | |
| Solvent composition | | | | |
| Methyl isobutyl ketone | 328.6 | 227.6 | — | 303.0 |
| Toluene | — | — | 156.9 | — |
| Ethylene glycol monoethyl ether | — | — | 150.0 | — |
| Monomer composition | | | | |
| 2-Hydroxyethyl methacrylate | 97.5 | 83.6 | 111.4 | 110.9 |
| Acrylic acid | — | — | — | — |
| Methyl methacrylate | 200.2 | 171.6 | 228.8 | 134.9 |
| n-Butyl acrylate | 122.3 | 104.8 | 139.8 | 138.2 |
| Styrene | — | — | — | 96.0 |
| Glycidyl methacrylate | 5.1 | 7.0 | 3.5 | 3.5 |
| Initiator | | | | |
| Asobis(isobutyronitrile) | 6.3 | 5.4 | — | — |
| t-Butylperoxy-2-ethylhexanoate | — | — | 9.6 | — |
| t-butyl peroxybenzoate | — | — | — | 12.0 |
| Reaction temperature | reflux | reflux | 120° C. | reflux |
| Properties of component (a) obtained by Process 1 | | | | |
| Acid number (mg KOH/g) | 50 | 50 | 100 | 100 |
| Hydroxyl number (mg KOH/g) | 100 | 100 | 100 | 150 |
| Glass transition temp. (° C.) | −20 | −20 | 0 | +30 |
| Number av. molecular weight | 5000 | 4900 | 4900 | 4800 |
| Properties of monomer combination (b) polymerized in Process 2 | | | | |
| Acid number (mg KOH/g) | 0 | 0 | 0 | 0 |
| Hydroxyl number (mg KOH/g) | 100 | 100 | 100 | 100 |
| Glass transition temp. (° C.) | +30 | +30 | +30 | +30 |
| Properties of the acrylic graft copolymer | | | | |
| Acid number (mg KOH/g) | 12 | 15 | 18 | 20 |
| Hydroxyl number (mg KOH/g) | 100 | 100 | 100 | 107 |
| Glass transition temp. (° C.) | +13 | +8 | +23 | +30 |
| Number av. molecular weight | 42000 | 32000 | 34000 | 31000 |
| Components (a)/(b) (w/w) | 30/70 | 40/60 | 20/80 | 20/80 |
| Components (b1)/(a) (mol/mol) | 1.0 | 1.0 | 1.0 | 1.0 |

TABLE 2

| Acrylic graft copolymer No. | A-5 | A-6 | A-7 | A-8 |
|---|---|---|---|---|
| Process 1 (parts by weight) | | | | |
| Solvent composition | | | | |
| Methyl isobutyl ketone | 95.5 | — | — | — |
| Toluene | — | 77.0 | 77.0 | 115.5 |
| Monomer composition | | | | |
| 2-Hydroxyethyl methacrylate | 34.8 | 27.9 | 27.9 | 41.8 |
| Acrylic acid | 9.6 | 15.4 | 15.4 | 23.1 |
| n-Butyl acrylate | 78.1 | 76.7 | 76.7 | 43.2 |
| 2-Ethylhexyl methacrylate | 27.5 | — | — | 71.9 |
| Styrene | — | — | — | — |

TABLE 2-continued

| Acrylic graft copolymer No. | A-5 | A-6 | A-7 | A-8 |
|---|---|---|---|---|
| Initiator | | | | |
| Azobis(isobutyronitrile) | — | — | — | — |
| t-Butylperoxy-2-ethyl-hexanoate | — | 3.0 | 3.0 | 4.5 |
| t-Butyl peroxybenzoate | 4.5 | — | — | — |
| Reaction temperature | reflux | reflux | reflux | reflux |
| Process 2 | | | | |
| Solvent composition | | | | |
| Methyl isobutyl ketone | 285.5 | — | — | — |
| Toluene | — | 154.5 | 310.5 | 264.3 |
| Ethylene glycol monoethyl ether | — | 150.0 | — | — |
| Monomer composition | | | | |
| 2-Hydroxyethyl methacrylate | 52.2 | 111.4 | 111.4 | 97.5 |
| Acrylic acid | 5.8 | — | — | — |
| Methyl methacrylate | 209.4 | 228.8 | 228.8 | 200.2 |
| n-Butyl acrylate | 92.6 | 139.8 | 139.8 | 122.3 |
| Styrene | 90.0 | — | — | — |
| Glycidyl methacrylate | 3.5 | 3.5 | 3.5 | 5.2 |
| Initiator | | | | |
| Asobis(isobutyronitrile) | — | — | — | — |
| t-Butylperoxy-2-ethyl-hexanoate | — | — | — | — |
| t-Butyl peroxybenzoate | 11.3 | 12.0 | 6.0 | 10.5 |
| Reaction temperature | reflux | reflux | reflux | reflux |
| Properties of component (a) obtained by Process 1 | | | | |
| Acid number (mg KOH/g) | 50 | 100 | 100 | 100 |
| Hydroxyl number (mg KOH/g) | 100 | 120 | 120 | 100 |
| Glass transition temp. (° C.) | −20 | −16 | −16 | 0 |
| Number av. molecular weight | 4800 | 4900 | 4900 | 4900 |
| Properties of monomer combination (b) polymerized in Process 2 | | | | |
| Acid number (mg KOH/g) | 10 | 0 | 0 | 0 |
| Hydroxyl number (mg KOH/g) | 50 | 100 | 100 | 100 |
| Glass transition temp. (° C.) | +50 | +30 | +30 | +30 |
| Properties of the acrylic graft copolymer | | | | |
| Acid number (mg KOH/g) | 20 | 18 | 18 | 27 |
| Hydroxyl number (mg KOH/g) | 59 | 104 | 104 | 100 |
| Glass transition temp. (° C.) | +29 | +20 | +20 | +20 |
| Number av. molecular weight | 31000 | 21000 | 43000 | 27000 |
| Components (a)/(b) (w/w) | 25/75 | 20/80 | 20/80 | 30/70 |
| Components (b1)/(a) (mol/mol) | 0.8 | 1.0 | 1.0 | 1.0 |

2) Making an aqueous dispersion

Ethylene glycol monobutyl ether 80.0 parts was added to 533.0 parts of acrylic graft copolymer A-1 obtained in 1) above, and then 205.0 parts of methyl isobutyl ketone were evaporated off under decreased pressure. Dimethylethanolamine 3.0 parts (carboxyl group equivalent 0.5) was added to this polymer solution, and after stirring, 588.9 parts of deionized water were added and stirred until it became homogeneous, to obtain a milky white low-viscosity aqueous dispersion B-1 of acrylic graft copolymer A-1.

Aqueous dispersions B-2 to B-8 of acrylic graft copolymers A-2 to A-8 were made by the same method using the combinations shown in Table 3. The nature of the aqueous dispersions obtained is shown in Table 3.

TABLE 3

| Aqueous dispersion No. | B-1 | B-2 | B-3 | B-4 | B-5 | B-6 | B-7 | B-8 |
|---|---|---|---|---|---|---|---|---|
| Acrylic graft copolymer employed | A-1 | A-2 | A-3 | A-4 | A-5 | A-6 | A-7 | A-8 |
| Amount of combined acrylic graft copolymer | 533.0 | 533.0 | 533.0 | 533.0 | 533.0 | 533.0 | 533.0 | 533.0 |
| Ethylene glycol monobutyl ether | 80.0 | 80.0 | — | 80.0 | 80.0 | — | 80.0 | 80.0 |
| Methyl isobutyl ketone removed under under decreased | 205.0 | 204.0 | — | 205.0 | 206.0 | — | — | — |
| Toluene removed under decreased pressure | — | — | 124.0 | — | — | 124.0 | 204.0 | 203.0 |
| Dimethylethanolamine | 3.0 | 3.8 | 4.6 | 5.1 | 5.1 | 4.6 | 4.6 | 6.8 |
| Deionized water | 588.9 | 587.2 | 586.4 | 586.9 | 587.9 | 586.4 | 586.4 | 583.2 |
| Nature of the aqueous dispersion obtained | Milky white low-viscosity liquid | Milky white low-viscosity liquid | Milky white low-viscosity liquid | Milky white low-viscosity liquid | Milky white low-viscosity liquid | Milky white low-viscosity liquid | Milky white low-viscosity liquid | Milky white low-viscosity liquid |

1) Low viscosity means $\mu$1 ps at 25° C.
2) Units are parts by weight

3) Preparation and performance testing of water-based paint compositions

Water-based paint compositions were prepared based on the combinations shown in Table 4. Thus, water-based paint compositions of 65 wt % solids were prepared by adding an aqueous dispersion B-1 to B-8 obtained in 2) above, an amino resin (Cymel 327 (Mitsui SciTech) trade name), titanium dioxide (Teika Rutile Titanium Dioxide JR602 (trade name Teika KK), dimethylethanolamine and deionized water. For evaluation using the method of application described previously, these water-based paints were prepared to a viscosity of 3±1 ps using a B viscosimeter at 6 rpm, by adding deionized water.

The results for the appearance of the resulting paint films and of performance tests, and also results for storage stability are shown in Table 5.

TABLE 5

| Embodiment No. | | 1 | 2 | 3 | 4 | 5 | 6 | 7 | 8 |
|---|---|---|---|---|---|---|---|---|---|
| Dry film thickness | Base coat ($\mu$m) | 15 | 15 | 14 | 15 | 15 | 16 | 15 | 15 |
| | Clear coat ($\mu$m) | 41 | 41 | 40 | 41 | 40 | 40 | 40 | 39 |
| Painted appearance | 60° gloss | 94 | 93 | 96 | 95 | 94 | 95 | 94 | 96 |
| | Smoothness | ○ | ○ | ○ | ○ | ○ | ○ | ○ | ○ |
| | Drip properties | ○ | ○ | ○ | ○ | ○ | ○ | ○ | ○ |
| Paint film performance | Water resistance | ○ | ○ | ○ | ○ | ○ | ○ | ○ | ○ |
| | Chemical resistance | ○ | ○ | ○ | ○ | ○ | ○ | ○ | ○ |
| Storage stability | | ○ | ○ | ○ | ○ | ○ | ○ | ○ | ○ |

TABLE 4

| Embodiment No. | | 1 | 2 | 3 | 4 | 5 | 6 | 7 | 8 |
|---|---|---|---|---|---|---|---|---|---|
| Aqueous dispersion employed | B-1 | 328.1 | — | — | — | — | — | — | — |
| | B-2 | — | 328.1 | — | — | — | — | — | — |
| | B-3 | — | — | 328.1 | — | — | — | — | — |
| | B-4 | — | — | — | 328.1 | — | — | — | — |
| | B-5 | — | — | — | — | 328.1 | — | — | — |
| | B-6 | — | — | — | — | — | 328.1 | — | — |
| | B-7 | — | — | — | — | — | — | 328.1 | — |
| | B-8 | — | — | — | — | — | — | — | 328.1 |
| Dimethylethanolamine | (Parts by Weight) | 1.3 | 1.5 | 1.5 | 1.5 | 1.5 | 1.5 | 1.5 | 2.2 |
| Cymel 327 | (Parts by weight) | 50.0 | 50.0 | 50.0 | 50.0 | 50.0 | 50.0 | 50.0 | 50.0 |
| Titanium dioxide | (Parts by weight) | 500.0 | 500.0 | 500.0 | 500.0 | 500.0 | 500.0 | 500.0 | 500.0 |
| Ethylene glycol monobutyl ether | (Parts by weight) | 50.0 | 50.0 | 50.0 | 50.0 | 50.0 | 50.0 | 50.0 | 50.0 |
| Deionized water | | 70.6 | 70.4 | 70.4 | 70.4 | 70.4 | 70.4 | 70.4 | 69.7 |
| Deionized water for adjusting viscosity | (Parts by weight) | 7.8 | 43.3 | 36.7 | 38.3 | 74.7 | 40.0 | 74.4 | 36.7 |
| Total | | 1007.8 | 1043.3 | 1036.7 | 10938.7 | 1074.4 | 1040.0 | 1074.4 | 1036.7 |
| Paint solids | (Parts by weight) | 64.5 | 62.3 | 62.7 | 62.6 | 60.5 | 62.5 | 60.5 | 62.7 |

Comparison Examples 1–10

1) Making an acrylic graft copolymer

Acrylic graft copolymers a-1 to a-10 were made by the same method as in Embodiments 1–8 1) according to the formulations shown in Table 6 to Table 8. Their properties are shown in Table 6 to Table 8.

TABLE 6

| Acrylic graft copolymer No. | a-1 | a-2 | a-3 | a-4 |
|---|---|---|---|---|
| Process 1 (parts by weight) | | | | |
| Solvent composition | | | | |
| Methyl isobutyl ketone | — | — | — | — |
| Toluene | 95.5 | 95.5 | 95.5 | 95.5 |
| Monomer composition | | | | |
| 2-Hydroxyethyl methacrylate | 27.9 | 34.8 | 3.5 | 69.6 |
| Acrylic acid | 15.5 | 19.4 | 19.4 | 19.4 |
| n-Butyl acrylate | 106.6 | — | 50.3 | 50.4 |
| n-Butyl methacrylate | — | 34.5 | — | 10.6 |
| Methyl methacrylate | — | 61.3 | 76.8 | — |
| 2-Ethylhexyl methacrylate | — | — | — | — |
| Initiator | | | | |
| t-Butyl peroxybenzoate | 4.5 | 4.5 | 4.5 | 4.5 |
| Reaction temperature | reflux | reflux | reflux | reflux |
| Process 2 (parts by weight) | | | | |
| Solvent composition | | | | |
| Methyl isobutyl ketone | — | — | — | — |
| Toluene | 286.7 | 286.6 | 286.6 | 286.6 |
| Monomer composition | | | | |
| 2-Hydroxyethyl methacrylate | 104.4 | 104.4 | 104.4 | 104.4 |
| n-Butyl methacrylate | — | — | — | — |
| Acrylic acid | — | — | — | — |
| Methyl methacrylate | 214.5 | 214.5 | 214.5 | 214.5 |
| n-Butyl acrylate | 131.1 | 131.1 | 131.1 | 131.1 |
| Glycidyl methacrylate | 4.3 | 4.4 | 4.4 | 4.4 |
| Initiator | | | | |
| t-Butylperoxy-2-ethyl-hexanoate | 9.0 | 9.0 | 9.0 | 9.0 |
| Reaction temperature | reflux | reflux | reflux | reflux |
| Properties of component (a) obtained by Process 1 | | | | |
| Acid number (mg KOH/g) | 80 | 100 | 100 | 100 |
| Hydroxyl number (mg KOH/g) | 80 | 100 | 10 | 200 |
| Glass transition temp. (° C.) | −28 | +70 | +30 | +10 |
| Number av. molecular weight | 4900 | 4800 | 4800 | 4700 |
| Properties of monomer combination (b) polymerized in Process 2 | | | | |
| Acid number (mg KOH/g) | 0 | 0 | 0 | 0 |
| Hydroxyl number (mg KOH/g) | 100 | 100 | 100 | 100 |
| Glass transition temp. (° C.) | +30 | +30 | +30 | +30 |
| Properties of the acrylic graft copolymer | | | | |
| Acid number (mg KOH/g) | 22 | 22 | 22 | 22 |
| Hydroxyl number (mg KOH/g) | 95 | 100 | 78 | 125 |
| Glass transition temp. (° C.) | +13 | +39 | +30 | +25 |
| Number av. molecular weight | 31000 | 33000 | 31000 | 31000 |
| Components (a)/(b) (w/w) | 25/75 | 25/75 | 25/75 | 25/75 |
| Components (b1)/(a) (mol/mol) | 1.0 | 1.0 | 1.0 | 1.0 |

TABLE 7

| Acrylic graft copolymer No. | a-5 | a-6 | a-7 |
|---|---|---|---|
| Process 1 (parts by weight) | | | |
| Solvent composition | | | |
| Methyl isobutyl ketone | — | 95.5 | 19.1 |
| Toluene | 95.5 | — | — |
| Monomer composition | | | |
| 2-Hydroxyethyl methacrylate | 34.8 | 34.8 | 7.0 |
| Acrylic acid | 19.4 | 19.4 | 3.9 |
| n-Butyl acrylate | 35.8 | 35.8 | 7.1 |
| n-Butyl methacrylate | — | — | — |
| Methyl methacrylate | — | — | — |
| 2-Ethylhexyl methacrylate | 60.0 | 60.0 | 12.0 |
| Initiator | | | |
| t-Butyl peroxybenzoate | 9.0 | 4.5 | 0.9 |
| Reaction temperature | reflux | reflux | reflux |
| Process 2 | | | |
| Solvent composition | | | |
| Methyl isobutyl ketone | — | 286.7 | 370.1 |
| Toluene | 273.2 | — | — |
| Monomer composition | | | |
| 2-Hydroxyethyl methacrylate | 104.4 | 104.4 | 132.2 |
| n-Butyl methacrylate | — | — | — |
| Acrylic acid | — | 17.3 | — |
| Methyl methacrylate | 214.5 | 170.7 | 271.7 |
| n-Butyl acrylate | 131.1 | 157.5 | 166.1 |
| Glycidyl methacrylate | 8.8 | 4.4 | 0.9 |
| Initiator | | | |
| t-Butylperoxy-2-ethyl-hexanoate | 13.5 | 9.0 | 9.0 |
| Reaction temperature | reflux | reflux | reflux |
| Properties of component (a) obtained by Process 1 | | | |
| Acid number (mg KOH/g) | 100 | 100 | 100 |
| Hydroxyl number (mg KOH/g) | 100 | 100 | 100 |
| Glass transition temp. (° C.) | 0 | 0 | 0 |
| Number av. molecular weight | 2400 | 4700 | 4700 |
| Properties of monomer combination (b) polymerized in Process 2 | | | |
| Acid number (mg KOH/g) | 0 | 30 | 0 |
| Hydroxyl number (mg KOH/g) | 100 | 100 | 100 |
| Glass transition temp. (° C.) | +30 | +20 | +30 |
| Properties of the acrylic graft copolymer | | | |
| Acid number (mg KOH/g) | 22 | 44 | 4 |
| Hydroxyl number (mg KOH/g) | 100 | 100 | 100 |
| Glass transition temp. (° C.) | +22 | +15 | +28 |
| Number av. molecular weight | 9300 | 31000 | 24000 |
| Components (a)/(b) (w/w) | 25/75 | 25/75 | 5/95 |
| Components (b1)/(a) (mol/mol) | 1.0 | 1.0 | 1.0 |

TABLE 8

| Acrylic graft copolymer No. | a-8 | a-9 | a-10 |
|---|---|---|---|
| Process 1 (parts by weight) | | | |
| Solvent composition | | | |
| Methyl isobutyl ketone | 95.5 | 95.5 | 95.5 |
| Toluene | — | — | — |

TABLE 8-continued

| Acrylic graft copolymer No. | a-8 | a-9 | a-10 |
|---|---|---|---|
| Monomer composition | | | |
| 2-Hydroxyethyl methacrylate | 34.8 | 34.8 | 34.8 |
| Acrylic acid | 28.9 | 19.4 | 19.4 |
| n-Butyl acrylate | 50.6 | 35.8 | 35.8 |
| n-Butyl methacrylate | — | — | — |
| Methyl methacrylate | — | — | — |
| 2-Ethylhexyl methacrylate | 35.7 | 60.0 | 60.0 |
| Initiator | | | |
| t-Butyl peroxybenzoate | 4.5 | 4.5 | 4.5 |
| Reaction temperature | reflux | reflux | reflux |
| Process 2 | | | |
| Solvent composition | | | |
| Methyl isobutyl ketone | 286.6 | 286.6 | 286.6 |
| Toluene | — | — | — |
| Monomer composition | | | |
| 2-Hydroxyethyl methacrylate | 104.4 | 41.8 | 208.8 |
| n-Butyl methacrylate | — | — | — |
| Acrylic acid | — | — | — |
| Methyl methacrylate | 214.5 | 264.0 | 132.0 |
| n-Butyl acrylate | 131.1 | 144.2 | 109.2 |
| Glycidyl methacrylate | 4.4 | 4.4 | 4.4 |
| Initiator | | | |
| t-Butylperoxy-2-ethyl-hexanoate | 9.0 | 9.0 | 9.0 |
| Reaction temperature | reflux | reflux | reflux |
| Properties of component (a) obtained by Process 1 | | | |
| Acid number (mg KOH/g) | 150 | 100 | 100 |
| Hydroxyl number (mg KOH/g) | 100 | 100 | 100 |
| Glass transition temp. (° C.) | 0 | 0 | 0 |
| Number av. molecular weight | 4700 | 4700 | 4700 |
| Properties of monomer combination (b) polymerized in Process 2 | | | |
| Acid number (mg KOH/g) | 0 | 0 | 0 |
| Hydroxyl number (mg KOH/g) | 100 | 40 | 200 |
| Glass transition temp. (° C.) | +30 | +30 | +30 |
| Properties of the acrylic graft copolymer | | | |
| Acid number (mg KOH/g) | 34 | 22 | 22 |
| Hydroxyl number (mg KOH/g) | 100 | 55 | 175 |
| Glass transition temp. (° C.) | +22 | +22 | +22 |
| Number av. molecular weight | 31000 | 31000 | 31000 |
| Components (a)/(b) (w/w) | 25/75 | 25/75 | 25/75 |
| Components (b1)/(a) (mol/mol) | 1.0 | 1.0 | 1.0 |

2) Making aqueous dispersions

Aqueous dispersions b-1 to b-10 of acrylic graft copolymers a-1 to a-10 were prepared from the acrylic graft copolymers a-1 to a-10 obtained in 1) above by the same method as in Embodiments 1–8 2) using the combinations shown in Table 9. However, when acrylic graft copolymer a-7 was used and the final 589.0 parts of deionized water were added and stirred a precipitate was produced, and a stable dispersion could not be obtained (Comparison Example 7)

TABLE 9

| Aqueous dispersion No. | b-1 | b-2 | b-3 | b-4 | b-5 | b-6 | b-7 | b-8 | b-9 | b-10 |
|---|---|---|---|---|---|---|---|---|---|---|
| Acrylic graft copolymer employed | a-1 | a-2 | a-3 | a-4 | a-5 | a-6 | a-7 | a-8 | a-9 | a-10 |
| Amount of combined acrylic graft copolymer | 533.0 | 533.0 | 533.0 | 533.0 | 533.0 | 533.0 | 533.0 | 533.0 | 533.0 | 533.0 |
| Ethylene glycol monobutyl ether | 80.0 | 80.0 | 80.0 | 80.0 | 80.0 | 80.0 | 80.0 | 80.0 | 80.0 | 80.0 |
| Methyl isobutyl ketone removed under decreased pressure | — | — | — | — | — | — | 203.0 | 203.0 | 203.0 | 203.0 |
| Toluene removed under decreased pressure | 203.0 | 203.0 | 203.0 | 203.0 | 203.0 | — | — | — | — | — |
| Dimethylethanolamine | 5.6 | 5.6 | 5.6 | 5.6 | 5.6 | 11.1 | 1.1 | 8.6 | 5.6 | 5.6 |
| Deionized water | 584.4 | 584.4 | 584.4 | 584.4 | 58.4 | 578.9 | 589.0 | 581.4 | 584.4 | 584.4 |
| Nature of the aqueous dispersion obtained | Milky white low-viscosity liquid | Milky white low-viscosity liquid | Milky white low-viscosity liquid | Milky white low-viscosity liquid | Highly viscous liquid | Highly viscous liquid | *1 | Highly viscous liquid | Milky white low-viscosity liquid | Milky white low-viscosity liquid |

1) Low viscosity means ≦1 ps at 25° C.
2) Highly viscous means ≧50 ps at 25° C.
3) Units are parts by weight
*1 A precipitate was produced and a stable aqueous dispersion could not be obtained 3) Preparation and performance testing of water-based paint compositions Water-based paint compositions were prepared by the same method as in Embodiment 1–8 3), based on the combinations in Table 10 and evaluated in the same way as for Embodiments 1–8. The results are shown in Table 11.

painted solids fraction of the resulting water-based paint was lowered, dripping occurred and the appearance of the paint film was inferior. The water resistance of the paint film obtained was also inferior.

In Comparison Example 8 the acid value of component (a) of the acrylic graft copolymer was too high and the acid

TABLE 10

| Embodiment No. | | 1 | 2 | 3 | 4 | 5 | 6 | 8 | 9 | 10 |
|---|---|---|---|---|---|---|---|---|---|---|
| Aqueous Dispersion | b-1 | 328.1 | — | — | — | — | — | — | — | — |
| employed | b-2 | — | 328.1 | — | — | — | — | — | — | — |
| (Parts by weight) | b-3 | — | — | 328.1 | — | — | — | — | — | — |
| | b-4 | — | — | — | 328.1 | — | — | — | — | — |
| | b-5 | — | — | — | — | 328.1 | — | — | — | — |
| | b-6 | — | — | — | — | — | 328.1 | — | — | — |
| | b-8 | — | — | — | — | — | — | 328.1 | — | — |
| | b-9 | — | — | — | — | — | — | — | 328.1 | — |
| | b-10 | — | — | — | — | — | — | — | — | 328.1 |
| Dimethylethanolamine | (Parts by Weight) | 1.8 | 1.8 | 1.8 | 1.8 | 1.8 | 1.8 | 1.8 | 1.8 | 1.8 |
| Cymel 327 | (Parts by weight) | 50.0 | 50.0 | 50.0 | 50.0 | 50.0 | 50.0 | 50.0 | 50.0 | 50.0 |
| Titanium dioxide | (Parts by weight) | 500.0 | 500.0 | 500.0 | 500.0 | 500.0 | 500.0 | 500.0 | 500.0 | 500.0 |
| Ethylene glycol monobutyl ether | (Parts by weight) | 50.0 | 50.0 | 50.0 | 50.0 | 50.0 | 50.0 | 50.0 | 50.0 | 50.0 |
| Deionized water | (Parts by weight) | 70.1 | 70.1 | 70.1 | 70.1 | 70.1 | 68.2 | 69.1 | 70.1 | 70.1 |
| Deionized water for adjusting viscosity | (Parts by weight) | 45.0 | 70.8 | 53.5 | 62.0 | 0.0 | 294.8 | 128.5 | 40.0 | 87.0 |
| Total | | 1045.0 | 1070.8 | 1053.5 | 1062.0 | 1000.0 | 1294.8 | 1128.5 | 1040.0 | 1087.0 |
| Paint solids | (Parts by weight) | 62.2 | 60.7 | 61.7 | 61.2 | 65.0 | 50.2 | 57.6 | 62.5 | 59.8 |

TABLE 11

| Comparison No. | | 1 | 2 | 3 | 4 | 5 | 6 | 8 | 9 | 10 |
|---|---|---|---|---|---|---|---|---|---|---|
| Dry film thickness | Base coat (μm) | 15 | 16 | 15 | 15 | 16 | 15 | 16 | 15 | 15 |
| | Clear coat (μm) | 40 | 40 | 41 | 41 | 41 | 40 | 40 | 41 | 40 |
| Painted appearance | 60° gloss | 93 | 90 | 95 | 94 | 93 | 95 | 94 | 95 | 93 |
| | Smoothness | ○ | x | ○ | ○ | ○ | ○ | ○ | ○ | ○ |
| | Drip properties | ○ | ○ | ○ | ○ | ○ | ○ | x | x | ○ |
| Paint film performance | Water resistance | ○ | ○ | ○ | x | x | x | x | ○ | x |
| | Chemical Resistance | ○ | ○ | x | ○ | x | ○ | ○ | x | ○ |
| Storage stability | | x | ○ | ○ | ○ | ○ | ○ | ○ | ○ | ○ |

It is evident from Table 11 that in Comparison Example 1 the storage stability of the water-based paint composition was inferior because the glass transition temperature of component (a) of the acrylic graft copolymer was too low.

In Comparison Example 2 the smoothness of the paint film obtained was inferior because the glass transition temperature of component (a) of the acrylic graft copolymer was too high.

In Comparison Example 3 the chemical resistance of the paint film obtained was inferior because the hydroxyl group number of component (a) of the acrylic graft copolymer was too low.

In Comparison Example 4 the water resistance of the paint film obtained was inferior because the hydroxyl group number of component (a) of the acrylic graft copolymer was too high.

In Comparison Example 5 the water resistance and chemical resistance of the paint film obtained were inferior because the number average molecular weight of the acrylic graft copolymer was too low.

In Comparison Example 6 the acid value of component (b) of the acrylic graft copolymer was too high and the acid value of the acrylic graft copolymer was too high so that the value of the acrylic graft copolymer was too high so that the painted solids fraction of the resulting water-based paint was lowered, dripping occurred and the appearance of the paint film was inferior. The water resistance of the paint film obtained was also inferior.

In Comparison Example 9 the chemical resistance of the resulting paint film was inferior because the hydroxyl group number of component (b) was too low.

In Comparison Example 10 the water resistance of the resulting paint film was inferior because the hydroxyl group number of component (b) of the acrylic graft copolymer was too high, and consequently the hydroxyl group number of the acrylic graft copolymer was too high.

By contrast, it is evident from Table 5 that the water-based paint compositions of Embodiments 1 to 8 had outstanding finished appearance, ease of application, paint film performance and storage stability.

Comparison Example 11

Methyl isobutyl ketone 95.5 parts was put into a reaction vessel provided with a stirrer, a temperature regulator, a cooling tube and a dropping device, stirred as the temperature was raised, and refluxed. A mixture of 2-hydroxyethyl methacrylate 34.8 parts, acrylic acid 19.4 parts, n-butyl acrylate 35.8 parts, 2-ethylhexyl methacrylate 60.0 parts and t-butyl peroxybenzoate 4.5 parts was then added dropwise over 2 hours. Stirring under reflux was continued for a further 2 hours to complete polymerization. The resin obtained was an acrylic copolymer of acid number 100 mg KOH/g, hydroxyl group number 100 mg KOH/g, glass transition temperature 0° C. and number average molecular weight 4700.

Methyl isobutyl ketone 293.6 parts was then put into this resin solution, and refluxed under stirring. Then a mixture of glycidyl methacrylate 4.4 parts, 2-hydroxyethyl methacrylate 104.4 parts, methyl methacrylate 214.5 parts, n-butyl acrylate 1311 parts and t-butylperoxy 2-ethylhexanoate 2.0 parts was added dropwise, requiring 2 hours. This mixture had an acid number of 0 mg KOH/g, a hydroxyl group number of 100 mg KOH/g; the weight ratio of component (a)/component (b) was 25/75 and the mol ratio of component (b1)/component (a) was 1.0. When stirring was continued after dropwise addition gelling was produced and it was impossible to make a graft copolymer.

What is claimed is:

1. A water-dispersible acrylic graft copolymer made by reacting together in a single-stage reaction
   (a) an acrylic copolymer of α,β-ethylenic unsaturated monomers, said acrylic copolymer having an acid number of 35 to 120 mg KOH/g, a hydroxyl group number of 50 to 150 mg KOH/g, a glass transition temperature of −20 to +50° C. and a number average molecular weight of 4500 to 9000, and
   (b) a monomer combination including
      (b1) α,β-ethylenic unsaturated monomer containing a glycidyl group and
      (b2) α,β-ethylenic unsaturated monomer containing a hydroxyl group, such that free radical polymerization of the monomer combination (b) proceeds simultaneously with reaction between carboxyl groups of acrylic copolymer (a) and the glycidyl group of monomer (b1);
   wherein the monomer combination (b) has an acid number of ±15 mg KOH/g and a hydroxyl group number of 50 to 150 mg KOH/g, the weight ratio of (a)/(b) is between 10/90 and 60/40, and the molar ratio of (b1)/(a) is between 0.4 and 1.5, and
   further wherein the resulting water-dispersible acrylic graft copolymer has an acid number of 10 to 30 mg KOH/g, a hydroxyl group number of 50 to 150 mg KOH/g, a glass transition temperature of −20 to +50 ° C. and a number-average molecular weight of 10,000 to 100,000.

2. A water-based paint composition comprising an acrylic graft copolymer according to claim 1.

3. A water-based paint composition according to claim 2, wherein said composition includes from about 40 to about 80 percent water.

4. A water-based paint composition according to claim 2, wherein said composition further includes an amino resin of a number average molecular weight up to about 1000.

5. A water-dispersible acrylic graft copolymer according to claim 1, wherein monomer combination (b) further includes other copolymerizable monomers (b3).

6. A water-dispersible acrylic graft copolymer according to claim 1, wherein said acrylic copolymer (a) has an acid number of 50 to 110 mg KOH/g, a hydroxyl group number of 60 to 150 mg KOH/g, a glass transition temperature of −20 to +30° C. and a number average molecular weight of 4800 to 7000.

7. A water-dispersible acrylic graft copolymer according to claim 1, wherein said monomer combination (b) has an acid number of ≦10 mg KOH/g and a hydroxyl group number of 50 to 120 mg KOH/g, the weight ratio of (a)/(b) is between 20/80 and 60/40, and the molar ratio of (b1)/(a) is between 0.8 and 1.2.

8. A water-dispersible acrylic graft copolymer according to claim 1, wherein said water-dispersible acrylic graft copolymer has an acid number of 15 to 30 mg KOH/g, a hydroxyl group number of 50 to 120 mg KOH/g, a glass transition temperature of −10 to +30° C. and a number-average molecular weight of 10,000 to 50,000.

9. A method for making a water-dispersible acrylic graft polymer, comprising a step of reacting together in a single-stage reaction
   (a) an acrylic copolymer of α,β-ethylenic unsaturated monomers, said acrylic copolymer having an acid number of 35 to 120 mg KOH/g, a hydroxyl group number of 50 to 150 mg KOH/g, a glass transition temperature of −20 to +50° C. and a number average molecular weight of 4500 to 9000, and
   (b) a monomer combination including
      (b1) α,β-ethylenic unsaturated monomer containing a glycidyl group and
      (b2) α,β-ethylenic unsaturated monomer containing a hydroxyl group,
   such that free radical polymerization of the monomer combination (b) proceeds simultaneously with reaction between carboxyl groups of acrylic copolymer (a) and the glycidyl group of monomer (b1);
   wherein the monomer combination (b) has an acid number of ≦15 mg KOH/g and a hydroxyl group number of 50 to 150 mg KOH/g, the weight ratio of (a)/(b) is between 10/90 and 60/40, and the molar ratio of (b1)/(a) is between 0.4 and 1.5, and
   further wherein the resulting water-dispersible acrylic graft copolymer has an acid number of 10 to 30 mg KOH/g, a hydroxyl group number of 50 to 150 mg KOH/g, a glass transition temperature of −20 to +50° C. and a number-average molecular weight of 10,000 to 100,000.

10. A method according to claim 9, wherein monomer combination (b) further includes other copolymerizable monomers (b3).

11. A method according to claim 9, wherein said acrylic copolymer (a) has an acid number of 50 to 110 mg KOH/g, a hydroxyl group number of 60 to 150 mg KOH/g, a glass transition temperature of −20 to +30° C. and a number average molecular weight of 4800 to 7000.

12. A method according to claim 9, wherein said monomer combination (b) has an acid number of ≦10 mg KOH/g and a hydroxyl group number of 50 to 120 mg KOH/g, the weight ratio of (a)/(b) is between 20/80 and 60/40, and the molar ratio of (b1)(a) is between 0.8 and 1.2.

13. A method according to claim 9, wherein said water-dispersible acrylic graft copolymer has an acid number of 15 to 30 mg KOH/g, a hydroxyl group number of 50 to 120 mg KOH/g, a glass transition temperature of −10 to +30° C. and a number-average molecular weight of 10,000 to 50,000.

* * * * *